United States Patent
Furuta et al.

(10) Patent No.: US 6,947,361 B2
(45) Date of Patent: Sep. 20, 2005

(54) DATA REPRODUCTION APPARATUS, DATA RECORDING AND REPRODUCTION APPARATUS, AND METHOD FOR REPRODUCING RECORDED DATA

(75) Inventors: Satoshi Furuta, Kato (JP); Shigenori Yanagi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 704 days.

(21) Appl. No.: 09/956,266

(22) Filed: Sep. 19, 2001

(65) Prior Publication Data

US 2002/0176344 A1 Nov. 28, 2002

(30) Foreign Application Priority Data

May 24, 2001 (JP) ........................................ 2001-155524

(51) Int. Cl.[7] .............................................. G11B 5/09
(52) U.S. Cl. .................. 369/47.35; 369/59.22
(58) Field of Search ........................... 369/47.15, 47.23, 369/47.24, 47.28, 47.35, 53.34, 59.19, 59.2, 59.21, 59.22, 124.05, 124.14

(56) References Cited

U.S. PATENT DOCUMENTS 5,598,392 A * 1/1997 Izumi et al. ............. 369/59.22
5,745,468 A * 4/1998 Nakano .................... 369/59.19
6,603,419 B2 * 8/2003 Nanba et al. ................ 341/155

FOREIGN PATENT DOCUMENTS

| JP | 07182801 A | 7/1995 |
| JP | 07264069 A | 10/1995 |
| JP | 08249667 A | 9/1996 |
| JP | 08339545 A | 12/1996 |
| JP | 09073734 A | 3/1997 |
| JP | 09120598 A | 5/1997 |
| JP | 10112030 A | 4/1998 |

\* cited by examiner

*Primary Examiner*—Paul W. Huber
(74) *Attorney, Agent, or Firm*—Greer, Burns & Crain, Ltd.

(57) ABSTRACT

A data reproduction apparatus includes first and second sampling parts which sample a reproduced signal from a recording medium in synchronism with first and second clock signals synchronizing respectively with leading and trailing edges of the reproduced signal and output leading and trailing sampled values, respectively, and a combination part which generates combined sampled values based on the leading and trailing sampled values. Recorded data is reproduced based on transition states of the combined sampled values output from the combination part in accordance with a maximum likelihood decoding technique corresponding to a predetermined partial response waveform.

14 Claims, 7 Drawing Sheets

TIME

DATA REPRODUCTION APPARATUS, DATA RECORDING AND REPRODUCTION APPARATUS, AND METHOD FOR REPRODUCING RECORDED DATA

BACKGROUND OF THE INVENTION

1. Field of the Invention

The present invention generally relates to data reproduction apparatuses for reproducing data recorded on a recording medium such as an optical disk, and more particularly to a data reproduction apparatus for reproducing data in accordance with maximum likelihood decoding from a signal reproduced from a recording medium on which the data is recorded in accordance with a recording signal with a partial response (PR) waveform.

2. Description of the Related Art

Conventionally, there has been proposed a recording and reproduction method using a PRML technique. According to this PRML technique, a recording signal obtained by modulating data to be recorded in accordance with a PR code is recorded on a recording medium such as a magneto-optical disk, a reproduced signal from the recording medium is sampled at a given frequency, and maximum likelihood (ML) data is reproduced from sampled values in a maximum likelihood data detector such as a Viterbi detector.

According to a data reproduction apparatus to which such a technique is applied, such as a magneto-optical disk unit, for instance, a signal is reproduced, or read out, from a recording medium recorded with a recording signal obtained by modulating data in accordance with PR(1, 1). Like the recording signal, the reproduced signal has its waveform equalized with a PR(1, 1) waveform as shown in FIG. 1A. Then, data having maximum likelihood as data before the PR(1, 1) modulation is reproduced from the transition states of strings of sampled values obtained by sampling the reproduced signal at a given frequency.

According to such a data reproduction apparatus, data is reproducible with good accuracy from a recording medium recorded with data at high density.

However, a reproduced signal from an MSR (Magnetically induced Super Resolution) medium that is a magneto-optical disk tends to have its level lowered slowly at a trailing edge part of the reproduced signal due to the characteristic of the MSR medium. Particularly, this tendency is noticeable if data is written to the MSR medium at a relatively high power. For instance, a reproduced signal corresponding to a 2T space part (a narrow distance part) between long marks (pits) formed on the medium by recording a signal modulated in accordance with PR(1, 1) may rise before lowering sufficiently as shown in FIG. 1B.

In the case of sampling such a reproduced signal having a characteristic that its signal level falls more slowly than rises in synchronism with, for instance, a clock signal synchronizing with rising edges of the reproduced signal, the transition of a sampled value Q is different from a correct one that should be obtained from a PR(1, 1) waveform at a trailing edge part of the reproduced signal indicated by a circle indicated by arrow A in FIG. 1C. Therefore, the recorded data is not faithfully reproduced by reproducing the data from the transition states of the sampled value Q by a maximum likelihood detector based on the premise of the PR(1, 1) waveform.

SUMMARY OF THE INVENTION

It is a general object of the present invention to provide a data reproduction apparatus in which the above-described disadvantage is eliminated.

A more specific object of the present invention is to provide a data reproduction apparatus for reproducing data with good accuracy even from a reproduced signal having different rising and falling characteristics.

The above objects of the present invention are achieved by a data reproduction apparatus including: first and second sampling parts which sample a reproduced signal from a recording medium in synchronism with first and second clock signals synchronizing respectively with leading and trailing edges of the reproduced signal and output leading and trailing sampled values, respectively; and a combination part which generates combined sampled values based on the leading and trailing sampled values, wherein recorded data is reproduced based on transition states of the combined sampled values output from the combination part in accordance with a maximum likelihood decoding technique corresponding to a predetermined partial response waveform.

According to the above-described data reproduction apparatus, the combined sampled values are generated based on the leading and trailing sampled values obtained by sampling the reproduced signal in synchronism with the first and second synchronizing clock signals independent from each other, respectively. Therefore, even if the leading or trailing edge parts of the reproduced signal may include a distortion, the transition state of sampled values obtained from the distorted part of the reproduced signal may be closer to that of sampled values correctly obtained from the predetermined partial response waveform. Thus, data is reproducible with good accuracy even from a reproduced signal having different leading and trailing edge characteristics.

The above objects of the present invention are also achieved by a data recording and reproduction apparatus including a data recording unit and a data reproduction unit, which data reproduction unit including: first and second sampling parts which sample a reproduced signal from a recording medium in synchronism with first and second clock signals synchronizing respectively with leading and trailing edges of the reproduced signal and output leading and trailing sampled values, respectively; a combination part which generates combined sampled values based on the leading and trailing sampled values; first and second maximum likelihood decoding parts; and a sampled value supply control part supplying the leading and trailing sampled values to the first and second maximum likelihood decoding parts, respectively, in a first operation mode for setting recording conditions in the recording unit and supplying the leading and trailing sampled values to the combination part and the combined sampled values output from the combination part to the first maximum likelihood decoding parts in a second operation mode for reproducing recorded data, wherein the recording conditions are determined based on data obtained in the first and second maximum likelihood decoding parts in the first operation mode; and the first maximum likelihood decoding part reproduces the recorded data based on transition states of the combined sampled values in accordance with a maximum likelihood decoding technique corresponding to a predetermined partial response waveform in the second operation mode.

According to the above-described data recording and reproduction apparatus, the same effects as the above-described data recording apparatus can be produced.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

A description will now be given, with reference to the accompanying drawings, of embodiments of the present invention.

Figure 1A:
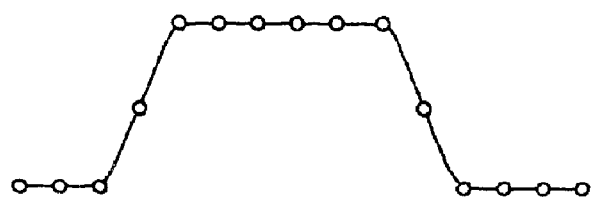
FIGS. 1A through 1C are diagrams showing waveforms of reproduced signals corresponding to a PR(1, 1) waveform and a transition state of sampled values of a reproduced signal according to a conventional data reproduction apparatus.
Figure 1B:
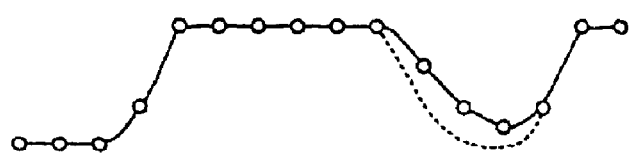
Figure 1C:
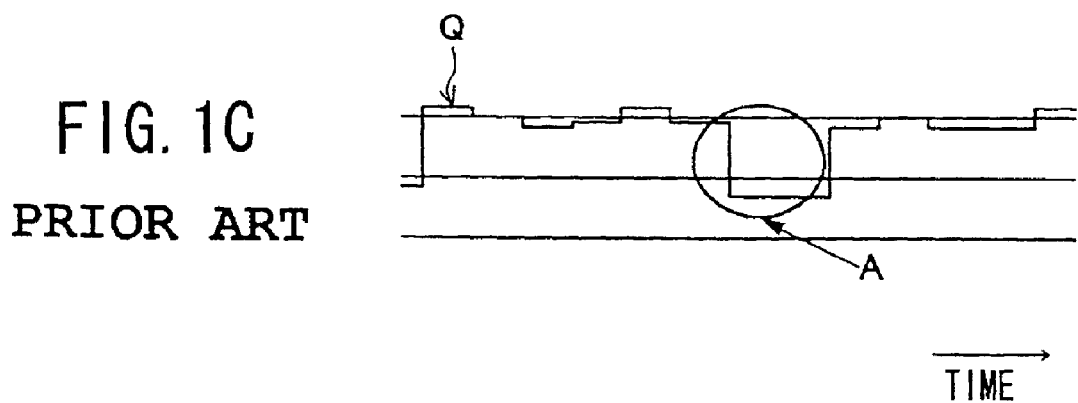
Figure 2:
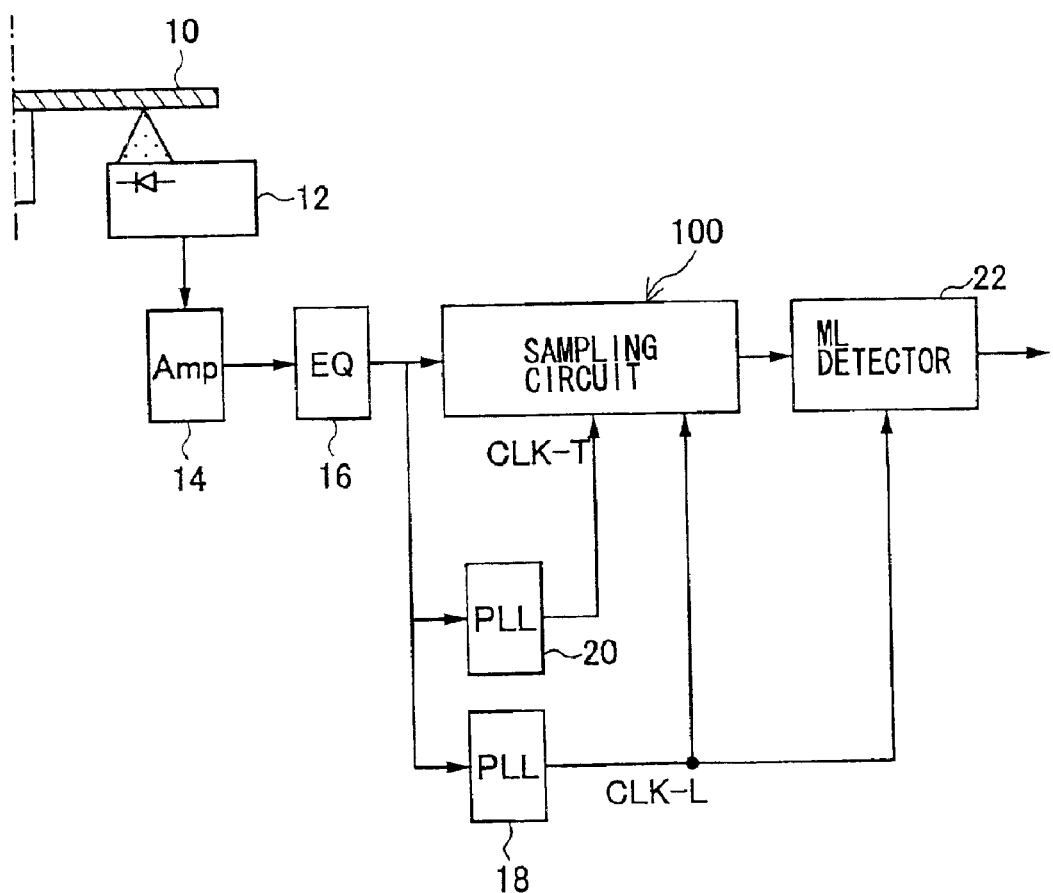
FIG. 2 is a block diagram showing a structure of a data reproduction apparatus according to a first embodiment of the present invention.

FIG. 2 is a block diagram showing a structure of a data reproduction apparatus according to a first embodiment of the present invention. According to this embodiment, data is reproduced from a magneto-optical disk recorded with a signal modulated in accordance with PR(1, 1).

In FIG. 2, the data reproduction apparatus includes an optical head 12 that optically reads data from a magneto-optical disk (MO) 10 that is a recording medium and outputs an electrical signal, an amplifier 14 that amplifies the output signal of the optical head 12, and a filter/equalizer 16 that waveform-equalizes an output signal of the amplifier 14. A signal output from the filter/equalizer 16 is supplied to a sampling circuit 100 as a reproduced signal.

The data reproduction apparatus further includes two PLL circuits 18 and 20. The PLL circuit 18 generates leading synchronizing clock signal CLK_L synchronous with the leading (rising) edge parts of the reproduced signal. The PLL circuit 20 generates trailing synchronizing clock signal CLK_T synchronous with the trailing (falling) edge parts of the reproduced signal.

The sampling circuit 100 samples the reproduced signal with the clock signal CLK_L and CLK_T being input thereto from the PLL circuits 18 and 20. Sampled values obtained in the sampling circuit 100 are successively supplied to an ML detector 22 such as a Viterbi detector. The ML detector operates in synchronism with the clock signal CLK_L supplied from the PLL circuit 18 so as to reproduce data having maximum likelihood as data before the PR(1, 1) modulation from the transition states of the sampled values in accordance with a maximum likelihood (ML) decoding algorithm corresponding to PR(1, 1).

Figure 3:
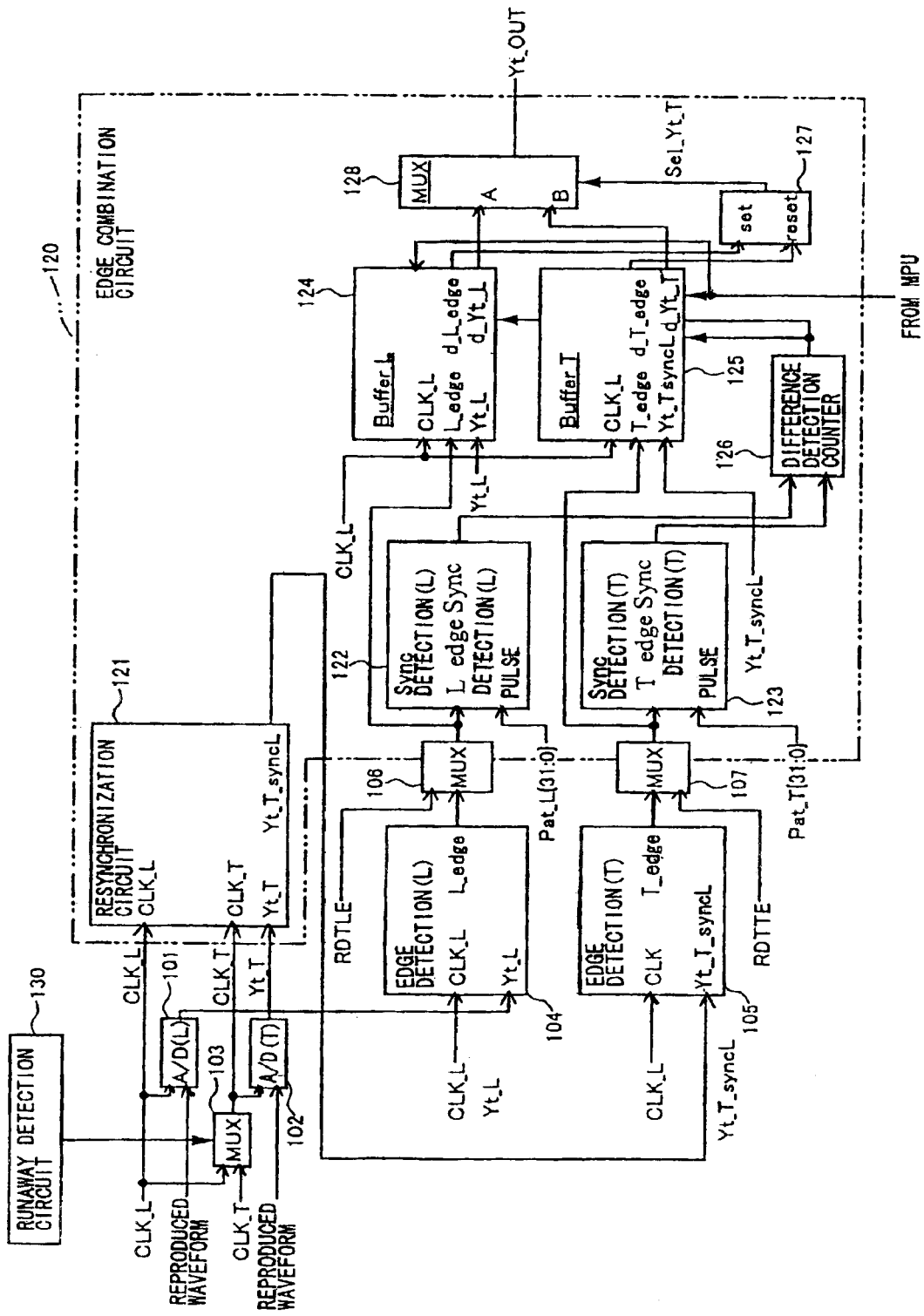
FIG. 3 is a block diagram showing a structure of a sampling circuit of the data reproduction apparatus of FIG. 2.

FIG. 3 is a block diagram showing a structure of the sampling circuit 100.

In FIG. 3, the sampling circuit 100 includes a first analog-to-digital (A/D) converter circuit 101, a second analog-to-digital (A/D) converter circuit 102, a switching circuit (MUX) 103, a leading edge detection circuit 104, a trailing edge detection circuit 105, switching circuits (MUX) 106 and 107, an edge combination circuit 120, and a runaway detection circuit 130. The edge combination circuit 120 includes a resynchronization circuit 121, a first synchronization signal detection circuit 122, a second synchronization signal detection circuit 123, a first phase adjustment circuit 124, a second phase adjustment circuit 125, a difference detection counter 126, a switching signal generation circuit 127, and a selector circuit (MUX) 128.

The first A/D converter circuit 101 converts the reproduced signal (a reproduced waveform) into a digital signal in synchronism with the leading synchronizing clock signal CLK_L and outputs the digital signal as a leading sampled value Yt_L. The switching circuit 103 selects and outputs one of the leading synchronizing clock signal CLK_L and the trailing synchronizing clock signal CLK_T based on a detection signal supplied from the runaway detection circuit 130. Normally, the switching circuit 103 outputs the trailing synchronizing clock signal CLK_T, and switches the trailing synchronizing clock signal CLK_T to the leading synchronizing clock signal CLK_L based on the detection signal supplied from the runaway detection circuit 130 if the runaway detection circuit 130 detects a runaway of the trailing synchronizing clock signal CLK_T. The second A/D converter circuit 102 converts the reproduced signal into a digital signal in synchronism with one of the leading synchronizing clock signal CLK_L and the trailing synchronizing clock signal CLK_T output from the switching circuit 103, and outputs the digital signal as a trailing sampled value Yt_T.

The leading synchronizing clock signal CLK_L, the clock signal (normally, the trailing synchronizing clock signal CLK_T) output from the switching circuit 103, and the trailing sampled value Yt_T from the second A/D converter circuit 102 are supplied to the resynchronization circuit 121 of the edge combination circuit 120. The resynchronization circuit 121 is supplied with the trailing sampled value Yt_T from the second A/D converter circuit 102 in synchronism with the clock signal (normally, the trailing synchronizing clock signal CLK_T) output from the switching circuit 103. Then, the resynchronization circuit 121 resynchronizes the trailing sampled value Yt_T with the leading synchronizing clock signal CLK_L and, thereafter, outputs the trailing sampled value Yt_T as a leading resynchronized sampled value Yt_T_syncL. Thus, by outputting the trailing sampled value Yt_T in synchronism with the leading synchronizing clock signal CLK_L, the leading resynchronized sampled value Yt_T_syncL can be processed in synchronism with the leading synchronizing clock signal CLK_L together with the leading sampled value Yt_L in subsequent operations.

The resynchronization circuit 121 may be supplied with the leading sampled value Yt_L from the first A/D converter circuit 101 in synchronism with the clock signal (normally, the leading synchronizing clock signal CLK_L) output from the switching circuit 103. In this case, the resynchronization circuit 121 resynchronizes the leading sampled value Yt_L with the trailing synchronizing clock signal CLK_T and, thereafter, outputs the leading sampled value Yt_L as a trailing resynchronized sampled value Yt_L_syncT. Thus, by outputting the leading sampled value Yt_L in synchronism with the trailing synchronizing clock signal CLK_T, the trailing resynchronized sampled value Yt_L_syncT can be processed in synchronism with the trailing synchronizing clock signal CLK_T together with the trailing sampled value Yt_T in subsequent operations.

The leading edge detection circuit 104, with the leading synchronizing clock signal CLK_L and the leading sampled value Yt_L from the first A/D converter circuit 101 being input thereto, detects a leading edge part of the reproduced signal from the transition state of the leading sampled value Yt_L. The trailing edge detection circuit 105, with the leading synchronizing clock signal CLK_L and the leading resynchronized sampled value Yt_T_syncL from the resynchronization circuit 121 being input thereto, detects a trailing edge part of the reproduced signal from the transition state of the leading resynchronized sampled value Yt_T_syncL.

The leading edge detection circuit 104, for instance, detects a leading edge of the reproduced signal in the following manner.

The leading edge detection circuit 104 compares three consecutive leading sampled values Yt2_L, Yt1_L, and Yt0_L (arranged in the order sampled) with slice levels preset by an MPU (not shown) and, if the following conditions are satisfied, detects a leading edge part of the reproduced signal.

a) The leading sampled value Yt2_L is lower than the slice level (Low 1).

b) The leading sampled value Yt1_L is higher than or equal to the slice level (Low 1) and lower than or equal to the slice level (High 1).

c) The leading sampled value Yt0_L is higher than the slice level (High 1).

The leading edge detection circuit 104 outputs a leading edge detection signal L_edge at a time t0 when it is determined that the above-described conditions are satisfied.

The trailing edge detection circuit 105 detects a trailing edge of the reproduced signal in the same manner as the leading edge detection circuit 104.

That is, the trailing edge detection circuit 105 compares three consecutive leading resynchronized sampled values Yt2_T_syncL, Yt1_T_syncL, and Yt0_T_syncL (arranged in the order sampled) with preset slice levels, and if the following conditions are satisfied, detects a trailing edge part of the reproduced signal.

a) The leading resynchronized sampled value Yt2_T_syncL is higher than the slice level (High 2).

b) The leading resynchronized sampled value Yt1_T_syncL is lower than or equal to the slice level (High 2) and higher than or equal to the slice level (Low 2).

c) The leading resynchronized sampled value Yt0_T_syncL is lower than the slice level (Low 2).

The trailing edge detection circuit 105 outputs a trailing edge detection signal T_edge at the time t0 when it is determined that the above-described conditions are satisfied.

The above-described slice levels Low 1 and High1 employed in the leading edge detection circuit 104 may be equal to or different from the slice levels Low2 and High 2 employed in the trailing edge detection circuit 105, respectively. Those slice levels are preferably determined in accordance with the characteristics of the leading and trailing edge parts of the reproduced signal.

The leading edge detection signal L_edge is supplied from the leading edge detection circuit 104 via the switching circuit (MUX) 106 to the first synchronization signal detection circuit 122 of the edge combination circuit 120. The first synchronization signal detection circuit 122 determines whether a leading pattern Pat_L[31:0] of a synchronous byte (Sync byte) consisting of 32 bits included in a recording signal, for instance, matches the pattern of the leading edge detection signal L_edge supplied from the leading edge detection circuit 104. If those patterns match, the first synchronization signal detection circuit 122 outputs a detection signal.

The trailing edge detection signal T_edge is supplied from the trailing edge detection circuit 105 via the switching circuit (MUX) 107 to the second synchronization signal detection circuit 123 of the edge combination circuit 120. The second synchronization signal detection circuit 123 determines whether a trailing pattern Pat_T[31:0] of the synchronous byte (Sync byte) matches the pattern of the trailing edge detection signal T_edge supplied from the trailing edge detection circuit 105. If those patterns match, the second synchronization signal detection circuit 123 outputs a detection signal.

The detection signals output from the first and second synchronization signal detection circuits 122 and 123 are supplied to the difference detection counter 126. The difference detection counter 126 measures a difference (time) between the inputs timing of the detection signals supplied from the first and second synchronization signal detection circuits 122 and 123 as a count number. The measured value is latched onto the difference detection counter 126 as a difference (amount). The difference becomes a positive value if a synchronization signal based on the leading edge detection signal L_edge is detected at an earlier timing than a synchronization signal based on the trailing edge detection signal T_edge, that is, if the detection signal is output from the first synchronization signal detection circuit 122 at an earlier timing than the detection signal is output from the second synchronization signal detection circuit 123, and the difference becomes a negative value if the detection timings of the synchronization signals are reversed.

The difference (count value) latched onto the difference detection counter 126 is supplied to a difference setting port of each of the first and second shift adjustment circuits 124 and 125. The leading edge detection signal L_edge is supplied from the leading edge detection circuit 104 via the switching circuit 106 to the first phase shift adjustment circuit 124. Further, the leading sampled value Yt_L output from the first A/D converter circuit 101 and the leading synchronizing clock signal CLK_L are supplied to the first phase shift adjustment circuit 124. The trailing edge detection signal T_edge is supplied from the trailing edge detection circuit 105 via the switching circuit 107 to the second phase shift adjustment circuit 125. Further, the leading resynchronized sampled value Yt_T_syncL output from the resynchronization circuit 121 and the leading synchronizing clock signal CLK_L are supplied to the second phase shift adjustment circuit 125.

If the difference supplied from the difference detection counter 126 is positive, the first phase adjustment circuit 124 outputs, in synchronism with the leading synchronizing clock signal CLK_L, the input leading edge detection signal L_edge and leading sampled value Yt_L directly as a phase-adjusted leading edge detection signal d_L_edge and a phase-adjusted leading sampled value d_Yt_L, respectively. In this case, the second phase adjustment circuit 125 shifts, or delays, by the number of clock pulses corresponding to the difference, the input trailing edge detection signal T_edge and leading resynchronized sampled value Yt_T_syncL, and outputs, in synchronism with the leading synchronizing clock signal CLK_L, the input trailing edge detection signal T_edge and leading resynchronized sampled value Yt_T_syncL as a phase-adjusted trailing edge detection signal d_T_edge and a phase-adjusted trailing sampled value d_Yt_T, respectively.

On the other hand, if the difference supplied from the difference detection counter 126 is negative, the first phase adjustment circuit 124 shifts, or delays, by the number of clock pulses corresponding to the difference, the input leading edge detection signal L_edge and leading sampled value Yt_L, and outputs, in synchronism with the leading synchronizing clock signal CLK_L, the input leading edge detection signal L_edge and leading sampled value Yt_L as the phase-adjusted leading edge detection signal d_L_edge and the phase-adjusted leading sampled value d_Yt_L, respectively. In this case, the second phase adjustment circuit 125 outputs the input trailing edge detection signal T_edge and leading resynchronized sampled value Yt_T_syncL directly as the phase-adjusted trailing edge detection signal d_T_edge and the phase-adjusted trailing sampled value d_Yt_T, respectively.

Any difference may be supplied to the difference setting port of each of the first and second phase adjustment circuits 124 and 125 from the control device (MPU) instead of the difference detection counter 126.

By means of the resynchronization circuit 121, the first and second synchronization signal detection circuits 122 and 123, the difference detection counter 126, and the first and second phase adjustment circuits 124 and 125, the phase-adjusted leading edge detection signal d_L_edge, leading sampled value d_Yt_L, trailing edge detection signal d_T_edge, and trailing sampled value d_Yt_T corresponding to the resynchronized sampled value Yt_T_syncL can be phase-adjusted on the time base of the leading synchronizing clock signal CLK_L. Therefore, a later-described signal combination can be performed easily.

The switching signal generation circuit 127 generates a signal that is set by the phase-adjusted leading edge detection signal d_L_edge phase-adjusted in the first phase adjustment circuit 124 and reset by the phase-adjusted trailing edge detection signal d_T_edge phase-adjusted in the second phase adjustment circuit 125, and outputs the signal at a timing delayed by one clock pulse as a switching signal Sel_Yt_T. The switching signal Sel_Yt_T is supplied to the selector circuit 128.

The selector circuit 128 has the phase-adjusted leading and trailing sampled values d_Yt_L and d_Yt_T input thereto from the first and second phase adjustment circuits 124 and 125, respectively, and selects the phase-adjusted trailing sampled value d_Yt_T if the switching signal Sel_Yt_T enters a set state. If the switching signal Sel_Yt_T enters a reset state, the selector circuit 128 selects the phase-adjusted leading sampled value d_Yt_L. The phase-adjusted leading or wailing sampled value d_Yt_L or d_Yt_T selected in the selector circuit 128 is supplied to the ML detector 22 of FIG. 2 as a sampled value Yt OUT of the reproduced signal.

Figure 4:
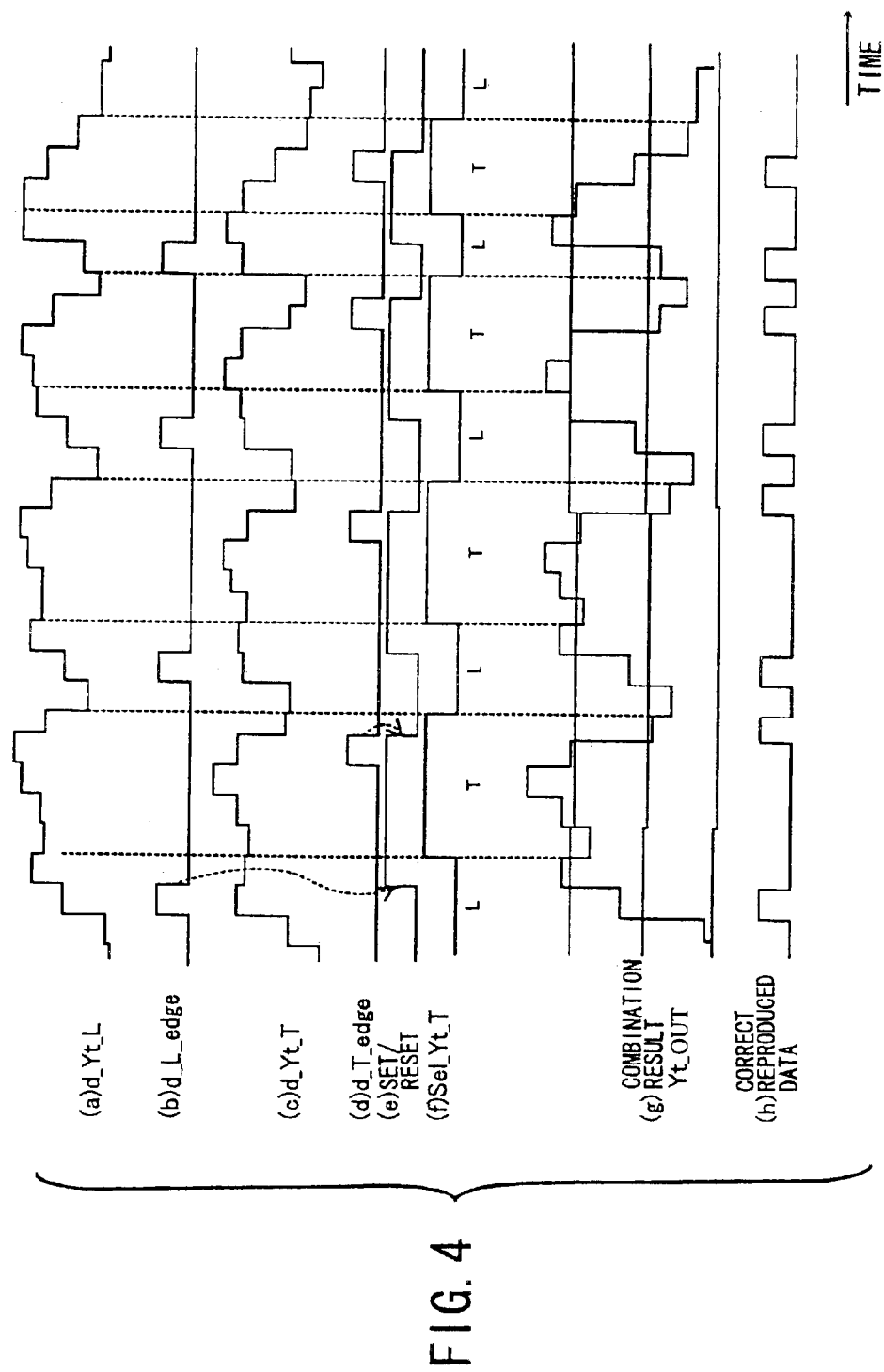
FIG. 4 is a timing chart of signals for illustrating an operation of the sampling circuit of FIG. 3.

In the above-described data reproduction apparatus, operations are performed in accordance with a timing chart of the signals shown in FIG. 4.

If the phase-adjusted leading sampled value d_Yt_L output from the first phase adjustment circuit 124 varies as shown in FIG. 4(a), the leading edge detection signal d_L_edge corresponding thereto is output from the first phase adjustment circuit 124 at the leading edge parts of the phase-adjusted leading sampled value d_Yt_L as shown in FIG. 4(b). Further, if the phase-adjusted trailing sampled value d_Yt_T output from the second phase adjustment circuit 125 varies as shown in FIG. 4(c), the trailing edge detection signal d_T_edge corresponding thereto is output from the second phase adjustment circuit 125 at the trailing edge parts of the phase-adjusted trailing sampled value d_Yt_T as shown in FIG. 4(d).

The switching signal generation circuit 127 generates the signal (set/reset) set by the phase-adjusted leading edge detection signal d_L_edge and reset by the phase-adjusted trailing edge detection signal d_T_edge as shown in FIG. 4(e). Then, as shown in FIG. 4(f), the switching signal generation circuit 127 outputs the switching signal Sel_Yt_T by delaying the signal (set/reset) by one clock pulse. Since the switching signal Sel_Yt_T is thus generated by delaying the signal (set/reset) by one clock pulse, the leading edge parts of the phase-adjusted leading sampled value d_Yt_L are included in periods during which the switching signal Sel_Yt_T is in a reset state (L selection periods) and the trailing edge parts of the phase-adjusted trailing sampled value d_Yt_T are included in periods during which the switching signal Sel_Yt_T is in a set state (T selection periods).

The selector circuit 128 selects the phase-adjusted leading or trailing sampled value d_Yt_L or d_Yt_T based on the switching signal Sel_Yt_T, thereby outputting a combination result (a combined sampled value) Yt_OUT as shown in FIG. 4(g). The combined sampled value Yt_OUT is supplied from the edge combination circuit 120 to the ML detector 22, which reproduces data as shown in FIG. 4(h) from the combined sampled value Yt_OUT in accordance with the ML decoding algorithm corresponding to PR(1, 1).

The above-described data reproduction apparatus combines the final sampled value of the reproduced signal by selecting the sampled value Yt_L obtained in synchronism with the leading synchronizing clock signal CLK_L in the leading edge parts of the reproduced signal and the sampled value of the reproduced signal by selecting the sampled value Yt_T obtained in synchronism with the trailing synchronizing clock signal CLK_T in the trailing edge parts of the reproduced signal.

Therefore, even if a reproduced signal is somewhat distorted at its trailing edge parts as a reproduced signal from the MSR medium, the transition states of sampled values at the trailing edge parts become closer to those that should be obtained from a PR(1, 1) waveform. As a result, recorded data is faithfully reproduced from these transition states of the sampled values by the ML detector 22 based on the premise of the PR(1, 1) waveform.

Therefore, since the recorded data is more faithfully reproducible even from the recording signal including some distortion, the margins of the recording conditions such as a writing power Pw and reproduction conditions of a signal for the magneto-optical disk 10 are widened.

In the above-described embodiment, the phase of the trailing synchronizing clock signal CLK_T with respect to the leading synchronizing clock signal CLK_L falls within an expected range. If the phase of the trailing synchronizing clock signal CLK_T goes beyond such an expected range, the runaway detection circuit 130 judges that the trailing synchronizing clock signal CLK_T makes a runaway and outputs the detection signal. If the runaway detection circuit 130 thus outputs the detection signal, the switching circuit 103 supplies the second A/D converter circuit 102 and the resynchronization circuit 121 with the leading synchronizing clock signal CLK_L instead of the trailing synchronizing clock signal CLK_T. In this case, the first and second A/D converter circuits 101 and 102 output the same sampled value at the same timing. As a result, the data reproduction apparatus has the same data reproduction function as a conventional data reproduction apparatus that obtains sampled values from a reproduced signal in synchronism with a leading synchronizing clock signal.

The runaway detection circuit 130 can judge that the trailing synchronizing clock signal CLK_T makes a runaway if bit strings (data) reproduced from the transition states of the phase-adjusted trailing sampled value d_Yt_L in accordance with the ML decoding algorithm do not satisfy a correct recording code such as a 1/7 code.

In the above-described embodiment, the data is assumed to be reproduced from the MSR medium that tends to have a signal reproduced therefrom include distortions at the trailing edge parts thereof. Therefore, the runaway detection circuit 130 is designed to detect a runaway of the trailing synchronizing clock signal CLK_T. However, in the case of other recording media or in a case where a reproduced signal tends to have distortions at the leading edge parts thereof due to recording conditions, the runaway detection circuit 130 may be designed to detect a runaway of the leading synchronizing clock signal CLK_L. Further, the runaway detection circuit 130 may be designed to detect a runaway of each of the leading and trailing synchronizing clock signal CLK_L and CLK_T so that one of the leading and trailing synchronizing clock signal CLK_L and CLK_T may be replaced by the other when the runaway of the one is detected.

Figure 5:
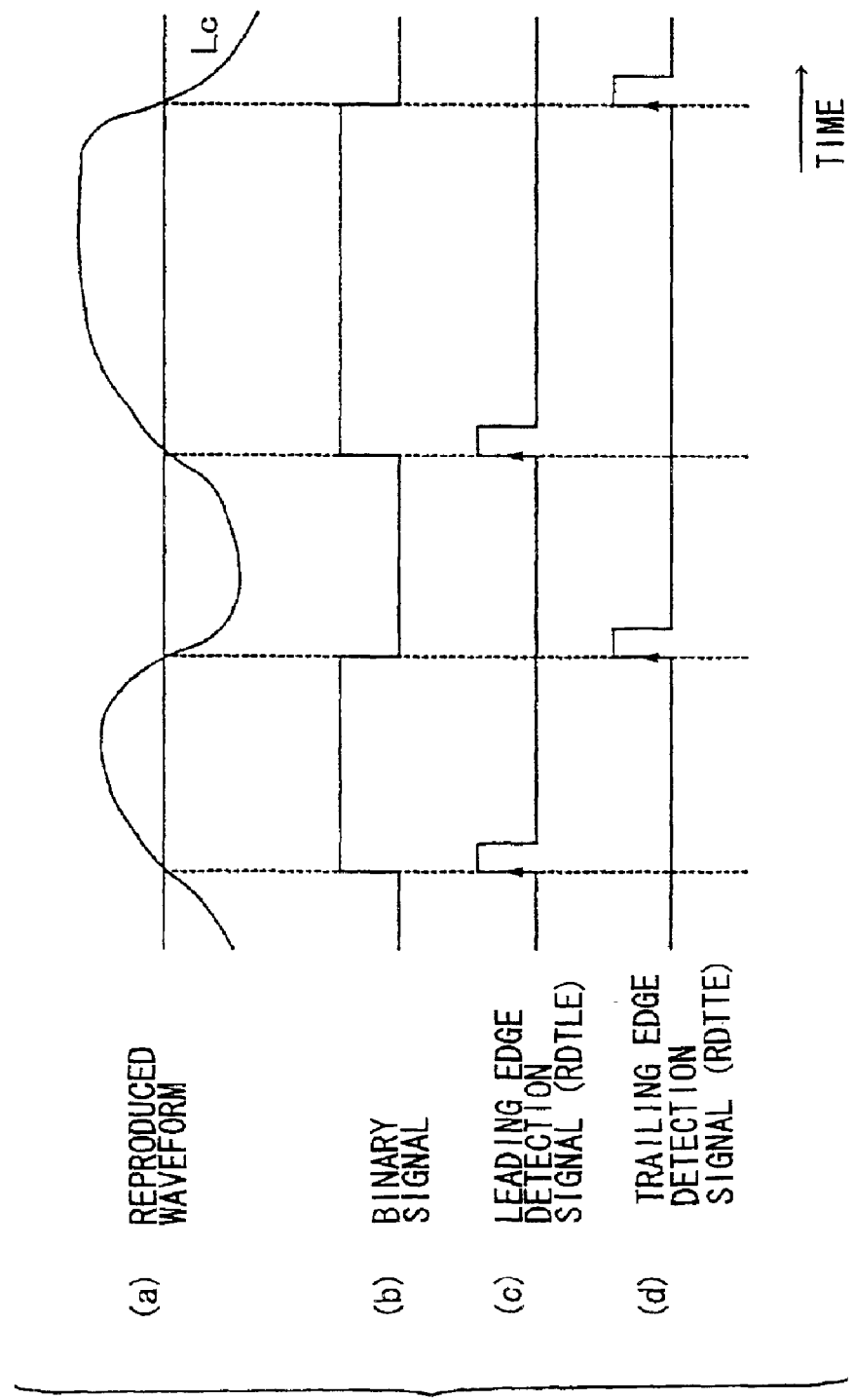
FIG. 5 is a timing chart of signals showing a method of detecting leading and trailing edges of a reproduced signal.

Further, in the above-described embodiment, the leading and trailing edge detection circuits 104 and 105 detect the leading and trailing edge parts of the reproduced signal from the transition states of the leading and trailing sampled values Yt_L and Yt_T, respectively. However, a method of detecting the edge parts of the reproduced signal is not limited to this, but the edge parts of the reproduced signal may be detected by a method illustrated in FIG. 5. According to the method, the reproduced signal shown in FIG. 5(a) is binarized into a binary signal shown in FIG. 5(b) by using a slice level Lc and a leading edge detection signal (RDTLE) shown in FIG. 5(c) and a trailing edge detection signal (RDTTE) shown in FIG. 5(d) are generated from the binary signal shown in FIG. 5(b). In this case, the leading edge detection signal (RDTLE) is supplied to the switching circuit 106. The trailing edge detection signal (RDTTE) is subjected to the above-described resynchronization operation in the resynchronization circuit 121 to be supplied to the switching circuit 107. According to this structure, the leading and trailing edge detection signals (RDTLE and RDTTE) can be supplied to the edge combination circuit 120 instead of the leading and trailing edge detection signals L_edge and T_edge, respectively, by the switching operations of the switching circuits 106 and 107.

A data reproduction apparatus is proposed which data reproduction apparatus includes two ML data detectors so that one of the ML data detectors reproduces data based on sampled values obtained from a reproduced signal in synchronism with the leading synchronizing clock signal CLK_L and the other reproduces data based on sampled values obtained from the reproduced signal in synchronism with the trailing synchronizing clock signal CLK_T. This data reproduction apparatus is a so-called Dual-PRML data reproduction apparatus and generates reproduced data by combining the above-described data reproduced in the two systems.

Figure 6:
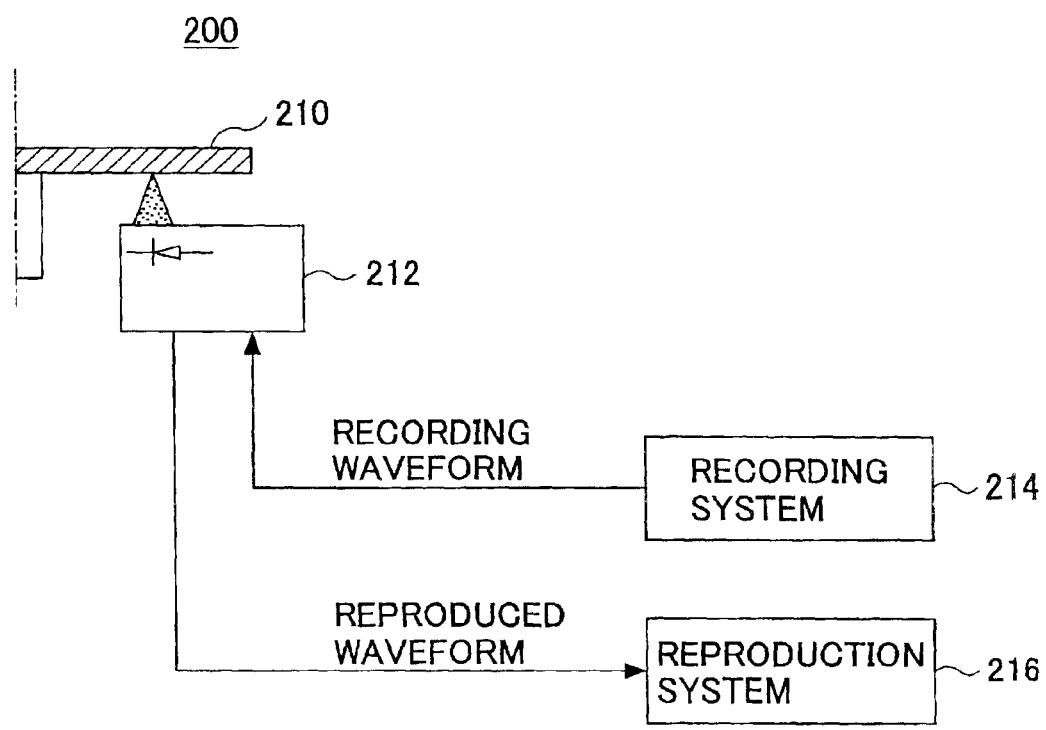
FIG. 6 is a schematic diagram showing a data recording and reproduction apparatus according to a second embodiment of the present invention.

In a data recording and reproduction apparatus including data recording and reproduction systems, the above-described Dual-PRML data reproduction apparatus and the above-described sampling circuit 100 may be applied to the data reproduction system. FIG. 6 is a diagram showing a basic structure of such a data recording and reproduction apparatus 200 according to a second embodiment of the present invention.

According to FIG. 6, the data recording and reproduction apparatus includes an optical head 212, a data recording system (unit) 214, and a data reproduction system (unit) 216. The optical head 212 records data on a magneto-optical disk 210 in accordance with a recording waveform supplied from the data recording system 214. The optical head 212 also reproduces data from the magneto-optical disk 210 and outputs a reproduced waveform to the data reproduction system 216.

Figure 7:
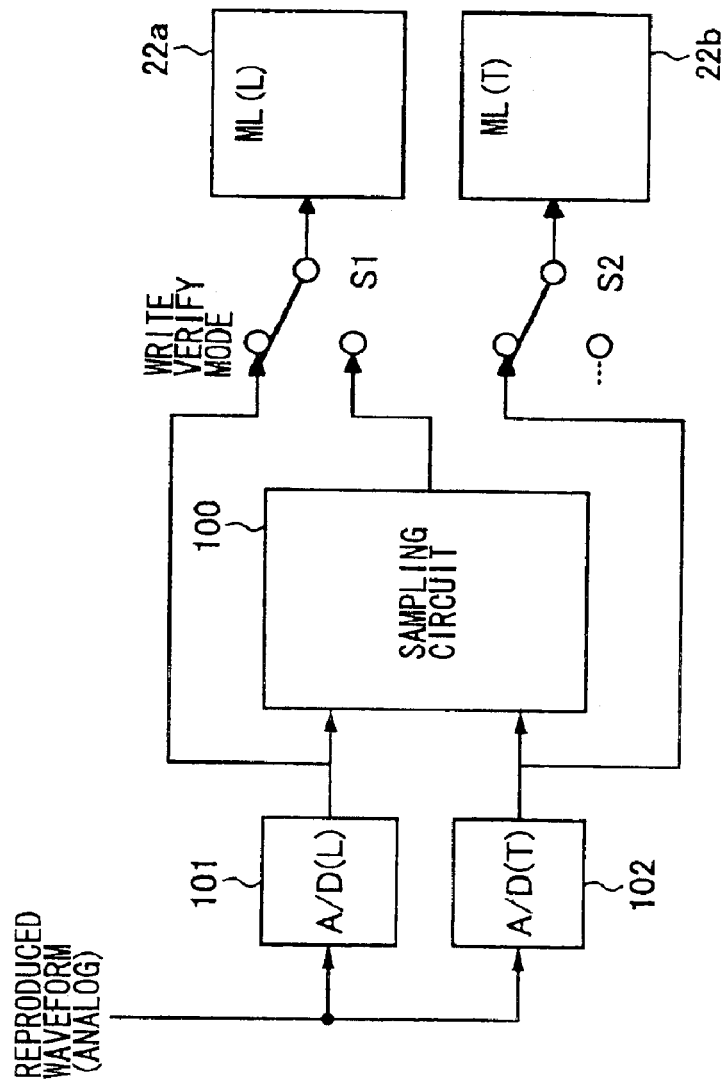
FIG. 7 is a block diagram showing a structure of a data reproduction system of the data recording and reproduction apparatus of FIG. 6.

FIG. 7 is a block diagram showing a structure of the reproduction system 216.

According to FIG. 7, the data reproduction system 216 of the data recording and reproduction apparatus 200 includes the first and second A/D converter circuits 101 and 102 sampling a reproduced signal in synchronism with the leading and trailing synchronizing clock signal CLK_L and CLK_T, respectively, the sampling circuit 100 having the structure shown in FIG. 3, and first and second ML detectors 22a and 22b. The first and second A/D converter circuits 101 and 102 included in the sampling circuit 100 in the first embodiment are provided outside the sampling circuit 100 in this embodiment.

The leading sampled value Yt_L obtained in the first A/D converter circuit 101 is supplied to the sampling circuit 100 and a switch S1. The trailing sampled value Yt_T obtained in the second A/D converter circuit 102 is supplied to the sampling circuit 100 and a switch S2. The above-described combined sampled value Yt_OUT is supplied to the switch S1. The switch S1 selects one of the leading sampled value Yt_L supplied from the first A/D converter circuit 101 and the combined sampled value Yt_OUT supplied from the sampling circuit 100 and supplies a selected one to the first ML detector 22a. The switch S2 determines by a switching operation whether to supply the trailing sampled value Yt_T to the second ML detector 22b.

In a first state where the leading and trailing sampled values Yt_L and Yt_T are supplied to the first and second ML detectors 22a and 22b, respectively, by the switching operations of the switches S1 and S2, the data reproduction system (unit) 216 of the data recording and reproduction apparatus 200 functions as a Dual-PRML data reproduction apparatus. On the other hand, in a second state where the leading sampled value Yt_L is supplied to the first ML detector 22a and no sampled value is supplied to the second ML detector 22b, the data reproduction system (unit) 216 functions as a data reproduction apparatus according to the structure shown in FIG. 2.

The data recording system 214 of this recording and reproduction apparatus 200 has the same structure as a known data recording apparatus for recording a recording signal on the magneto-optical disk 210.

The data reproduction system 216 of the data recording and reproduction apparatus 200 is set in the first state by the switching operations of the switches S1 and S2 in operation modes for setting recording conditions, such as a Write Verify mode, a Write Power learning mode, and a Write Test mode.

In this state, the data recording system 214 writes a predetermined test recording signal to the magneto-optical disk 210 in accordance with the set recording conditions. Thereafter, in the reproduction system, the leading sampled value Yt_L is supplied from the first A/D converter circuit 101 to the first ML detector 22a via the switch S1 and the trailing sampled value is supplied from the second A/D converter circuit 102 to the second ML detector 22b via the switch S2. The first ML detector 22a reproduces data based on the supplied leading sampled value Yt_L and the second ML detector 22b reproduces data based on the supplied trailing sampled value Yt_T. A control apparatus (not shown) determines whether the reproduced data from each of the first and second ML detectors 22a and 22b corresponds to the predetermined test recording signal. If the determination results show that the reproduced data does not correspond to the predetermined test recording signal, the recording system changes the recording conditions and rewrites the predetermined test recording signal to the magneto-optical disk 10 (Write Retry).

If the reproduced data corresponds to the predetermined recording signal as a result of repeating the above-described operation, the recording conditions at that point are determined as the final recording conditions. The data recording system 214 writes data to be recorded to the magneto-optical disk 210 in accordance with the determined recording conditions.

Next, in the case of reproducing data from the magneto-optical disk 210 recorded with the data to be recorded in the above-described manner, the data reproduction system 216 is set in the second state by the switching operations of the switches S1 and S2.

In this state, by the same operation as in the above-described embodiment (see FIGS. 3 and 4), the combined sampled value Yt_OUT is supplied from the sampling circuit 100 to the first ML detector 22a via the switch S1. Then, the first ML detector 22a, for instance, reproduces data having maximum likelihood as data before the PR(1, 1) modulation from the transition states of the supplied combined sampled value Yt_OUT as in the above-described embodiment.

According to the above-described recording and reproduction apparatus 200, recording and reproduction of the test recording signal is performed under conditions with stricter margins in the operation modes for setting the recording conditions and the recording conditions are determined based on the reproduction results. The data is reproduced from the magneto-optical disk 210 recorded with the data in accordance with the determined recording conditions by the method described in the first embodiment which method widens the margins of the reproduction conditions for correct data reproduction. Therefore, data reproduction can be performed with less errors.

In the above-described embodiments, the first and second A/D converter circuits 101 and 102 forms first and second sampling parts of the data reproduction apparatus and the sampling circuit 100 forms a combination part of the data reproduction apparatus.

Further, the resynchronization circuit 121 forms a resynchronization part of the data reproduction apparatus and the first and second synchronization signal detection circuits 122 and 123 and the difference detection counter 126 form a difference detection part of the data reproduction apparatus, and the first and second phase adjustment circuits 124 and 125 form a phase adjustment part of the data reproduction apparatus.

Furthermore, the leading and trailing edge detection circuits 104 and 105 form an edge detection part of the data reproduction apparatus, the switching signal generation circuit 127 forms a switching signal generation part of the data reproduction apparatus, and the selector circuit (MUX) 128 forms an output selection part of the data reproduction apparatus.

Moreover, the first and second ML detectors 22a and 22b form first and second maximum likelihood detection part of the data reproduction apparatus, respectively, and the switches S1 and S2 form a sampled value supply control part of the data reproduction apparatus.

The present invention is not limited to the specifically disclosed embodiments, but variations and modifications may be made without departing from the scope of the present invention.

The present application is based on Japanese priority application No. 2001-155524 filed on May 24, 2001, the entire contents of which are hereby incorporated by reference.

What is claimed is:

1. A data reproduction apparatus comprising:

first and second sampling parts which sample a reproduced signal from a recording medium in synchronism with first and second clock signals synchronizing respectively with leading and trailing edges of the reproduced signal and output leading and trailing sampled values, respectively;

a combination part which generates combined sampled values based on the leading and trailing sampled values, wherein recorded data is reproduced based on transition states of the combined sampled values output from said combination part in accordance with a maximum likelihood decoding technique corresponding to a predetermined partial response waveform; and a resynchronization part resynchronizing the leading or trailing sampled values sampled in synchronism with one of the first and second clock signals with the other predetermined one of the first and second clock signals so that the leading and trailing sampled values are processed in synchronism with the predetermined one of the first and second clock signals in said combination part.

2. The data reproduction apparatus as claimed in claim 1, wherein said combination part comprises a phase adjustment part which performs phase adjustment on the leading and trailing sampled values based on a phase difference amount therebetween and combines the phase-adjusted leading and trailing sampled values, the leading or trailing sampled values being resynchronized with the predetermined one of the first and second clock signals in said resynchronization part.

3. The data reproduction apparatus as claimed in claim 2, wherein the phase difference is supplied from a predetermined control apparatus to the phase adjustment part.

4. The data reproduction apparatus as claimed in claim 2, wherein said combination part comprises a difference detection part which detects the phase difference between the leading and trailing sampled values.

5. The data reproduction apparatus as claimed in claim 4, wherein said difference detection part comprises:

a first reference signal detection part judging whether a detection pattern of the leading edges of the reproduced signal matches a leading pattern of a predetermined reference signal included in a signal recorded on the recording medium and outputting a first detection signal if the detection pattern of the leading edges of the reproduced signal matches the leading pattern of the reference signal;

a second reference signal detection part judging whether a detection pattern of the trailing edges of the reproduced signal matches a trailing pattern of the reference signal and outputting a second detection signal if the detection pattern of the trailing edges of the reproduced signal matches the trailing pattern of the reference signal; and a timing difference measurement part measuring a difference between output timings of the first and second detection signals, wherein the phase difference is expressed by the difference between the output timings.

6. A data reproduction apparatus comprising:

first and second sampling parts which sample a reproduced signal from a recording medium in synchronism with first and second clock signals synchronizing respectively with leading and trailing edges of the reproduced signal and output leading and trailing sampled values, respectively;

a combination part which generates combined sampled values based on the leading and trailing sampled values, wherein recorded data is reproduced based on transition states of the combined sampled values output from said combination part in accordance with a maximum likelihood decoding technique corresponding to a predetermined partial response waveform; and a first edge detection part detecting the leading and trailing edges of the reproduced signal, wherein said combination part comprises:

a switching signal generation part generating a switching signal switching between first and second states corresponding to leading and trailing edge parts of the reproduced signal based on the leading and trailing edges of the reproduced signal, respectively; and an output selection part selectively outputting the leading sampled values if the switching signal switches to the first state and the trailing sampled values if the switching signal switches to the second state; and said combination part generates the combined sampled values from the leading and trailing sampled values output from said output selection part.

7. The data reproduction apparatus as claimed in claim 6, wherein said switching signal generation part generates the switching signal by delaying, for a predetermined period of time, a signal that enters a set state if the leading edges of the reproduced signal are detected and a reset state if the trailing edges of the reproduced signal are detected.

8. The data reproduction apparatus as claimed in claim 6, wherein said first edge detection part comprises:

a leading edge detection part detecting the leading edges of the reproduced signal based on transition states of the leading sampled values supplied from said first sampling part; and a trailing edge detection part detecting the trailing edges of the reproduced signal based on transition states of the trailing sampled values supplied from said second sampling part.

9. The data reproduction apparatus as claimed in claim 6, further comprising:

a second edge detection part detecting the leading and trailing edges of the reproduced signal; and a selection part selecting one of the first and second edge detection parts, wherein the leading and trailing edges detected by the selected one of the first and second edge detection parts are supplied to said combination part.

10. A data reproduction apparatus comprising:

first and second sampling parts which sample a reproduced signal from a recording medium in synchronism with first and second clock signals synchronizing respectively with leading and trailing edges of the reproduced signal and output leading and trailing sampled values, respectively;

a combination part which generates combined sampled values based on the leading and trailing sampled values, wherein recorded data is reproduced based on transition states of the combined sampled values output from said combination part in accordance with a maximum likelihood decoding technique corresponding to a predetermined partial response waveform;

a clock abnormality detection part detecting an abnormality in one of first and second operations synchronized with the first and second clock signals, respectively; and a clock switching part switching a clock signal with which the first operation is synchronized from the first clock signal to the second clock signal if the abnormality is detected in the first operation and switching a clock signal with which the second operation is synchronized from the second clock signal to the first clock signal if the abnormality is detected in the second operation.

11. A data recording and reproduction apparatus comprising:

a data recording unit; and a data reproduction unit, said data reproduction unit comprising:

first and second sampling parts which sample a reproduced signal from a recording medium in synchronism with first and second clock signals synchronizing respectively with leading and trailing edges of the reproduced signal and output leading and trailing sampled values, respectively;

a combination part which generates combined sampled values based on the leading and trailing sampled values;

first and second maximum likelihood decoding parts; and a sampled value supply control part supplying the leading and trailing sampled values to said first and second maximum likelihood decoding parts, respectively, in a first operation mode for setting recording conditions in said recording unit and supplying the leading and trailing sampled values to said combination part and the combined sampled values output from said combination part to said first maximum likelihood decoding parts in a second operation mode for reproducing recorded data, wherein:

the recording conditions are determined based on data obtained in said first and second maximum likelihood decoding parts in the first operation mode; and said first maximum likelihood decoding part reproduces the recorded data based on transition states of the combined sampled values in accordance with a maximum likelihood decoding technique corresponding to a predetermined partial response waveform in the second operation mode.

12. The data recording and reproduction apparatus as claimed in claim 11, wherein:

said data reproduction unit further comprises an edge detection part detecting the leading and trailing edges of the reproduced signal;

said combination part comprises:

a switching signal generation part generating a switching signal switching between first and second states corresponding to leading and trailing edge parts of the reproduced signal based on the leading and trailing edges of the reproduced signal, respectively; and an output selection part selectively outputting the leading sampled values if the switching signal switches to the first state and the trailing sampled values if the switching signal switches to the second state; and said combination part generates the combined sampled values from the leading and trailing sampled values output from said output selection part.

13. A method for reproducing a recorded data from a recording medium, comprising:

a first sampling step for sampling a reproduced signal from a recording medium in synchronism with first clock signals synchronizing with leading edges of the reproduced signal and outputting leading sampled values;

a second sampling step for sampling the reproduced signal in synchronism with second clock signals synchronizing with trailing edges of the reproduced signal and outputting trailing sampled values;

a resynchronization step for resynchronizing the leading or trailing sampled values sampled in synchronism with one of the first and second clock signals with the other predetermined one of the first and second clock signals;

a combination step generating combined sampled values based on the leading and trailing sampled values; and a reproduction step for reproducing the recorded data based on the combined sampled values in synchronism with the predetermined one of the first and second clock signals.

14. A method for reproducing a recorded data from a recording medium, comprising:

a first sampling step which samples a reproduced signal from a recording medium in synchronism with first and second clock signals synchronizing respectively with leading and trailing edges of the reproduced signal and output leading and trailing sampled values, respectively;

a combination step which generates combined sampled values based on the leading and trailing sampled values, wherein recorded data is reproduced based on transition states of the combined sampled values output in accordance with a maximum likelihood decoding technique corresponding to a predetermined partial response waveform; and a detecting step which detects an abnormality in one of first and second operations synchronized with the first and second clock signals, respectively; and a switching step which switches a clock signal with which the first operation is synchronized from the first clock signal to the second clock signal if the abnormality is detected in the first operation and switching a clock signal with which the second operation is synchronized from the second clock signal to the first clock signal if the abnormality is detected in the second operation.

* * * * *